(12) United States Patent  
Farnet et al.

(10) Patent No.: US 7,412,891 B2  
(45) Date of Patent: Aug. 19, 2008

(54) SIP AND PUFF MOUSE

(75) Inventors: Michael G. Farnet, Lenexa, KS (US); Harold R. McWilliams, Lenexa, KS (US); John J. Stutz, Shawnee, KS (US)

(73) Assignee: Pivot International, Inc., Lenexa, KS (US)

( * ) Notice: Subject to any disclaimer, the term of this patent is extended or adjusted under 35 U.S.C. 154(b) by 0 days.

(21) Appl. No.: 11/670,215

(22) Filed: Feb. 1, 2007

(65) Prior Publication Data

US 2007/0180917 A1 Aug. 9, 2007

Related U.S. Application Data

(60) Provisional application No. 60/771,842, filed on Feb. 9, 2006.

(51) Int. Cl.
*G01L 7/00* (2006.01)
(52) U.S. Cl. .................................................. 73/700
(58) Field of Classification Search .................. 73/700, 73/756
See application file for complete search history.

(56) References Cited

U.S. PATENT DOCUMENTS 5,630,411 A * 5/1997 Holscher ................ 128/205.24

* cited by examiner

*Primary Examiner*—Andre J Allen
(74) *Attorney, Agent, or Firm*—Hovey Williams LLP

(57) ABSTRACT

An electronic data input apparatus comprises a receptacle, a tube, a housing for electronic components, and a harness. The receptacle is operable for use in a user's mouth. The tube connects the receptacle to the housing, which is attached to the harness. A user wears the harness on the upper part of the torso, such that the receptacle is accessible to the mouth. A cable connects the electronic component housing to a computing element and establishes serial communication from the input apparatus to the computing element. The apparatus may provide the same function as a conventional mouse pointing device by allowing the user to control the motion of a pointer on an electronic display by breathing in to and out of the receptacle.

6 Claims, 8 Drawing Sheets

```
┌─────────────────────────────────┐
│     TOGGLE THE MOTION OF THE POINTER │
│     BETWEEN HORIZONTAL AND VERTICAL  │
 134 │  DIRECTIONS CORRESPONDING TO    │
│     NEGATIVE PRESSURE ON THE        │
│     PRESSURE SENSOR FOR A DURATION  │
│     OF LESS THAN 0.5 SECONDS        │
└─────────────────────────────────┘
                │
                ▼
┌─────────────────────────────────┐
│   SELECT AN OBJECT ON THE DISPLAY IN │
 135 │  THE VICINITY OF THE POINTER    │
│     CORRESPONDING TO POSITIVE       │
│     PRESSURE ON THE PRESSURE        │
│     SENSOR FOR A DURATION OF LESS   │
│     THAN 0.5 SECONDS                │
└─────────────────────────────────┘
```

*Fig. 7B*

SIP AND PUFF MOUSE

RELATED APPLICATION

The present non-provisional application claims the benefit of U.S. Provisional Application No. 60/771,842, entitled "SIP AND PUFF MOUSE," filed Feb. 9, 2006. The identified provisional application is incorporated herein by specific reference.

BACKGROUND OF THE INVENTION

1. Field of the Invention

Embodiments of the present invention relate to an apparatus and methods for controlling an input to an electronic device. More particularly, various embodiments of the present invention relate to controlling a pointer on an electronic display by receiving breath from a user.

2. Description of the Related Art

Interactive electronic devices, such as computers, personal digital assistants, and voting machines, generally accept input from a user through the operation of a data input element, such as a touchscreen, a keyboard, a mouse, or a tablet and stylus. The touchscreen generally requires applying pressure to a desired area of the screen. The keyboard generally requires pressing and releasing the keys, or typing. The mouse generally requires movement of its body over a designated area. The tablet and stylus generally require marking of the tablet with the stylus, typically in a fashion similar to handwriting.

The cited data input elements, as well as others not listed, generally require the user to have the use of at least one arm and hand in order to control and manipulate the data input element. However, users without the use of at least one arm and hand may have difficulty in performing the actions described above. Therefore, an apparatus and method for controlling an input to an interactive electronic device is required that does not involve manipulation by hand.

SUMMARY OF THE INVENTION

Embodiments of the present invention solve the above-described problems and provide a distinct advance in the art of controlling an input to an electronic device. More particularly, various embodiments of the invention provide an apparatus and method for controlling the input to an electronic device that do not require manipulation by hand. Instead, a user is able to control an electronic data input device by breathing in and out of a receptacle that is part of a system which attaches to the user's torso.

Various embodiments of the present invention include an electronic data input apparatus. The apparatus comprises a receptacle, a tube, a pressure sensing device, a processing element, a box, and a harness. The receptacle is adapted to fit in a user's mouth and is operable to receive air pressure when the user breathes in or out. The tube connects the receptacle to the pressure sensing device, which converts the air pressure to an electronic signal. The processing element converts the electronic signal into positioning information. The pressure sensing device and the processing element are housed within the box, which is connected to the harness. The harness may attach to a user's torso such that the receptacle, held in place by the tube, can be taken into the user's mouth.

Other embodiments of the present invention include a method of controlling an input to an electronic device. The method includes receiving air pressure from a user, wherein the air pressure may be generated by breathing in (sipping) or by breathing out (puffing). Next, the air pressure is converted to an electronic signal. Finally, the electronic signal is utilized to control the input to the electronic device.

Further embodiments include a method of controlling a pointer on an electronic display. The method includes moving the pointer toward the top and bottom of the display, as well as moving the pointer to the left and right sides of the display. The various motions of the pointer correspond to varying pressure on a pressure sensing device for varying durations of time. The method also includes toggling the motion of the pointer between horizontal and vertical directions corresponding to a certain pressure on the pressure sensing device for a certain time duration. Additionally, the method includes selecting an object on the display in the vicinity of the pointer corresponding to a specified pressure on the pressure sensing device for a specified time duration.

Other aspects and advantages of the present invention will be apparent from the following detailed description of the preferred embodiments and the accompanying drawing figures.

BRIEF DESCRIPTION OF THE DRAWINGS

A preferred embodiment of the present invention is described in detail below with reference to the attached drawing figures, wherein:

FIG. 7A and FIG. 7B show a chart listing some of the steps operable to be performed by various embodiments of the present invention.

Figure 1:
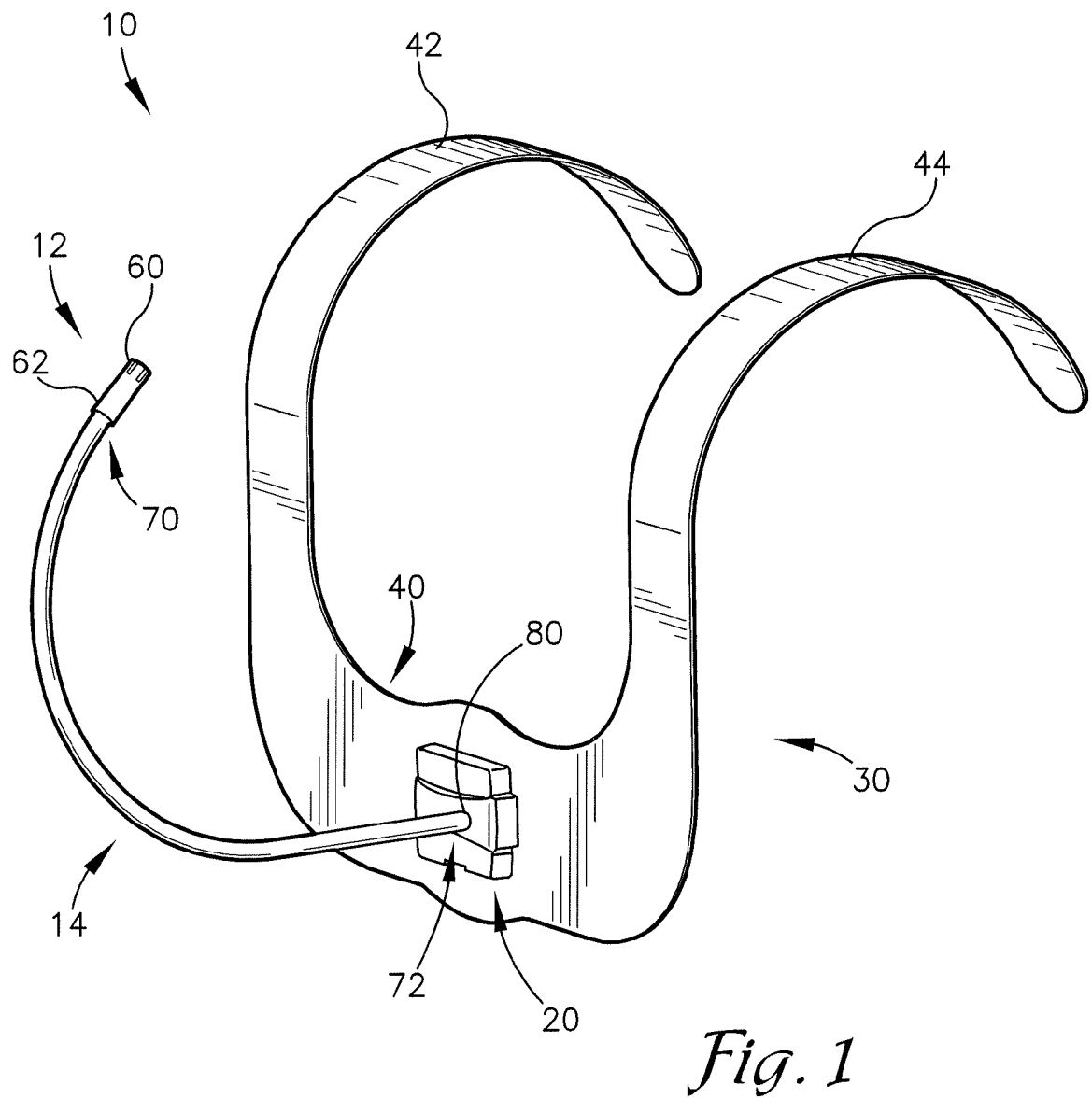
FIG. 1 is a perspective view of one embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments may be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
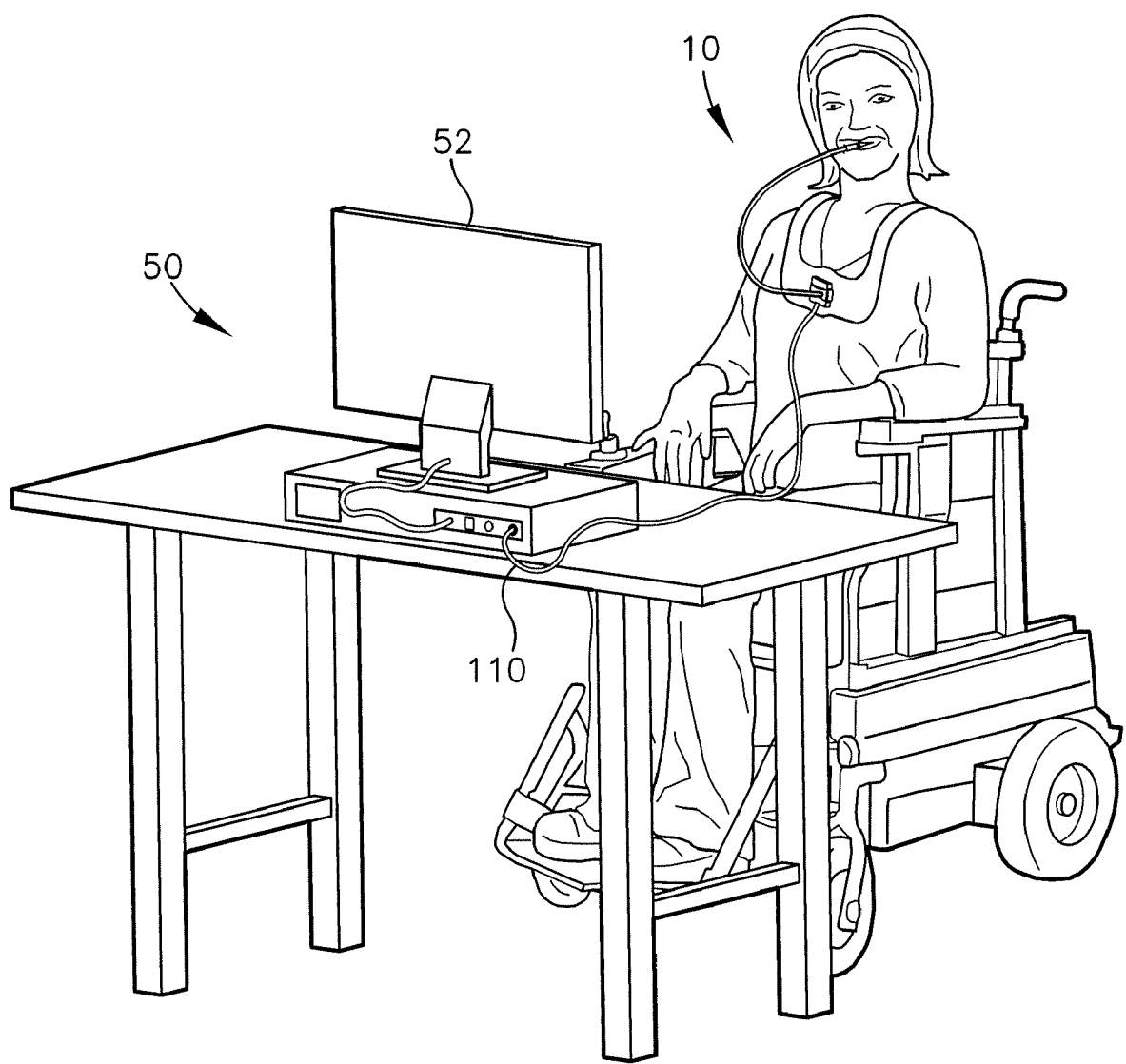
FIG. 2 is a perspective view of one embodiment of the invention being utilized.

An electronic data input apparatus constructed in accordance with an exemplary embodiment of the current invention is illustrated in FIG. 1 and FIG. 2 and is designated generally by the numeral 10. Although embodiments of the present invention relate generally to an apparatus and methods for controlling an input to an electronic device, the exemplary embodiment of a pointing device 10, used to control the actions of an on-screen pointer, as the electronic data input apparatus is described in detail in the specification. It is noted, however, that the teachings of the present application may also be used to control other aspects of electronic data input, such as character-based and numerical data input, graphical-based data input, drafting operations, selection of items within a list, selection of control operations, editing of pre-existing data, etc.

Figure 3:
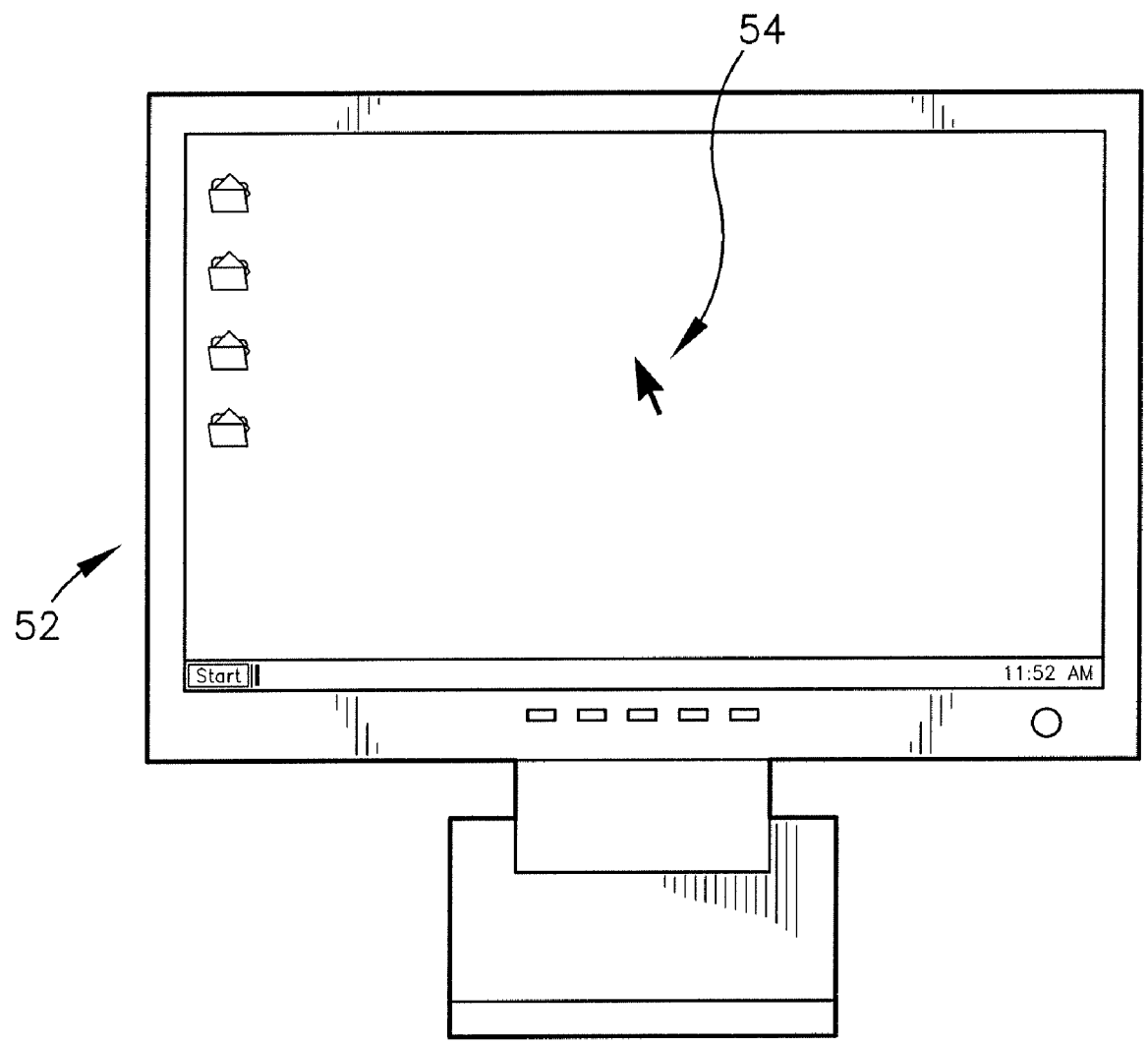
FIG. 3 is a view of an electronic display that includes a pointer.

The pointing device 10 comprises a receptacle 12, a tube 14, a component housing 20, and a harness 30. The harness 30 further comprises a bib 40 and straps 42, 44. As shown in FIG. 2 and FIG. 3, the pointing device 10 is generally utilized in an environment where it may be operated by a user while the device is connected to a computing element 50 with a display 52, in order to control a pointer 54 on the display 52 of the computing element 50.

The computing element 50 may include a processor coupled with a memory to perform the various functions described herein. As should be appreciated, the processor and memory may be integral or discrete and comprise various generally conventional devices, such as microcontrollers, microprocessors, programmable logic devices, desktop computers, laptop computers, palm-held devices, servers, portable computing devices, etc. The computing element 50 may also include other electronic data processing equipment such as voting machines, financial access machines, audio and video equipment, communications equipment, medical equipment, etc. The display 52 may include standard monitor types of variable size such as cathode ray tubes (CRTs), plasma monitors, light-emitting diode (LED) displays, liquid-crystal displays (LCDs), digital light processing (DLP) displays, rear-projection displays, overhead projection displays, etc. Furthermore, the pointer 54 may include an on-screen indicator of variable size and shape such as an arrow, a hand, a finger, a vertical bar, etc.

As demonstrated in FIG. 1 and FIG. 2, the receptacle 12 may be operable to be utilized in the mouth of a human being. Thus, the receptacle 12 is generally shaped and sized to be comfortable when retained in the mouth for extended periods of time. The receptacle 12 may be cylindrical shaped, with a proximal end 60 and a distal end 62. The proximal end 60 is received in the mouth and various embodiments include slits around the circumference of the proximal end 60. The distal end 62 is coupled with the tube 14.

The receptacle 12 may be approximately 1 inch in length and approximately 0.25 inches in diameter. The receptacle 12 may be manufactured from plastic. Other materials, such as certain metals, are possible, provided that they can be formed to the proper size and shape and that they can be cleaned and sterilized. Thus, the receptacle 12 can be removed, as discussed below, and replaced as wear and buildup of contaminants dictate.

The tube 14, generally cylindrical in shape, provides air pressure communication between the receptacle 12 and the component housing 20 and includes a first end 70 and a second end 72. The first end 70 of the tube 14 may be coupled to the distal end 62 of the receptacle 12 by means of sliding the distal end 62 of the receptacle 12, which is slightly larger in diameter, onto the first end 70 of the tube 14. Other means of fastening, such as threaded mating, are possible that hold the receptacle 12 on the tube 14 while still allowing the receptacle 12 to be removed from the tube 14.

Likewise, the second end 72 of the tube 14 may be coupled to an input port 80 of the component housing 20 by sliding the second end 72 of the tube 14 into the input port 80 of the component housing 20. Other means of fastening, such as threaded mating, are possible that hold the second end 72 of the tube 14 in the input port 70 of the component housing 20 while still allowing the tube 14 to be removed from the housing 20.

The tube 14 may be manufactured from flexible plastic with embedded metal wire, such that the tube 14 can be bent and maintained in a desired shape. The tube 14 may be manufactured from other materials or combinations of materials that allow flexible and adjustable connection of the receptacle 12 with the component housing 20, such as rubber hosing with embedded metal wire. Most importantly, the critical property of the tube 14 is to provide the user with the ability to retain the receptacle 12 in his mouth in a comfortable position with respect to the component housing 20.

The component housing 20 may be affixed to the center of the bib portion 40 of the harness 30. The point of attachment may be elsewhere on the harness 30, but the center of the bib 40 provides the optimum balance of the weight of the component housing 20 and the tube 12 with the weight of the harness 30, and provides proper alignment of the tube 12 with the mouth.

The attachment of the component housing 20 to the harness 30 may be removable. The attachment means includes, but is not limited to, clips, snaps, hook and loop fasteners, or other semi-permanent fasteners.

In various embodiments, the receptacle 12, the tube 14, and the component housing 20, as well as the electronic components therein, may be manufactured for disposable usage. For this embodiment, one pointing device 10 may be assigned for use with a given computing device 50. After each usage, the receptacle 12, the tube 14, and the component housing 20 may be removed from the harness 30 and disposed of. The disposed of items are then replaced before the next usage.

As shown in FIG. 2, the harness 30 is generally worn on the upper torso of the body. The bib 40 typically rests on a portion of the user's chest while the straps 42, 44 generally hook over the user's shoulders. The straps 42, 44 of various embodiments are flexible. This setup allows adjustment of the harness 30 side to side and up and down on the user's body in order for the user to achieve comfortable positioning of the receptacle 12 in his mouth. Furthermore, other embodiments include a bib 40 that is expandable in the horizontal direction to accommodate user's torsos of different sizes.

The harness 30 may be manufactured from injection molded plastic or sheet plastic material such that the bib 40 and straps 42, 44 are a monolithic unit. In the case of sheet plastic material, the harness shape is cut and then the material is heat bent to form the straps 42, 44. Plastics that may be used to manufacture the harness 30 include, but are not limited to, polystyrene (PS), polyethylene terephthalate (PET), and acrylonitrile butadiene styrene (ABS). The harness 30 may also be manufactured from a plurality of plastic blister packs, wherein the bib 40 is formed from one blister pack and the straps 42, 44 are formed from two separate blister packs. The three blister pack components are combined and assembled to create the harness 30. In another embodiment, the harness 30 may be created for short-term use from cardboard that has been patterned in the shape of the harness 30, and then cut and folded to form the bib 40 and the straps 42, 44.

Figure 4:
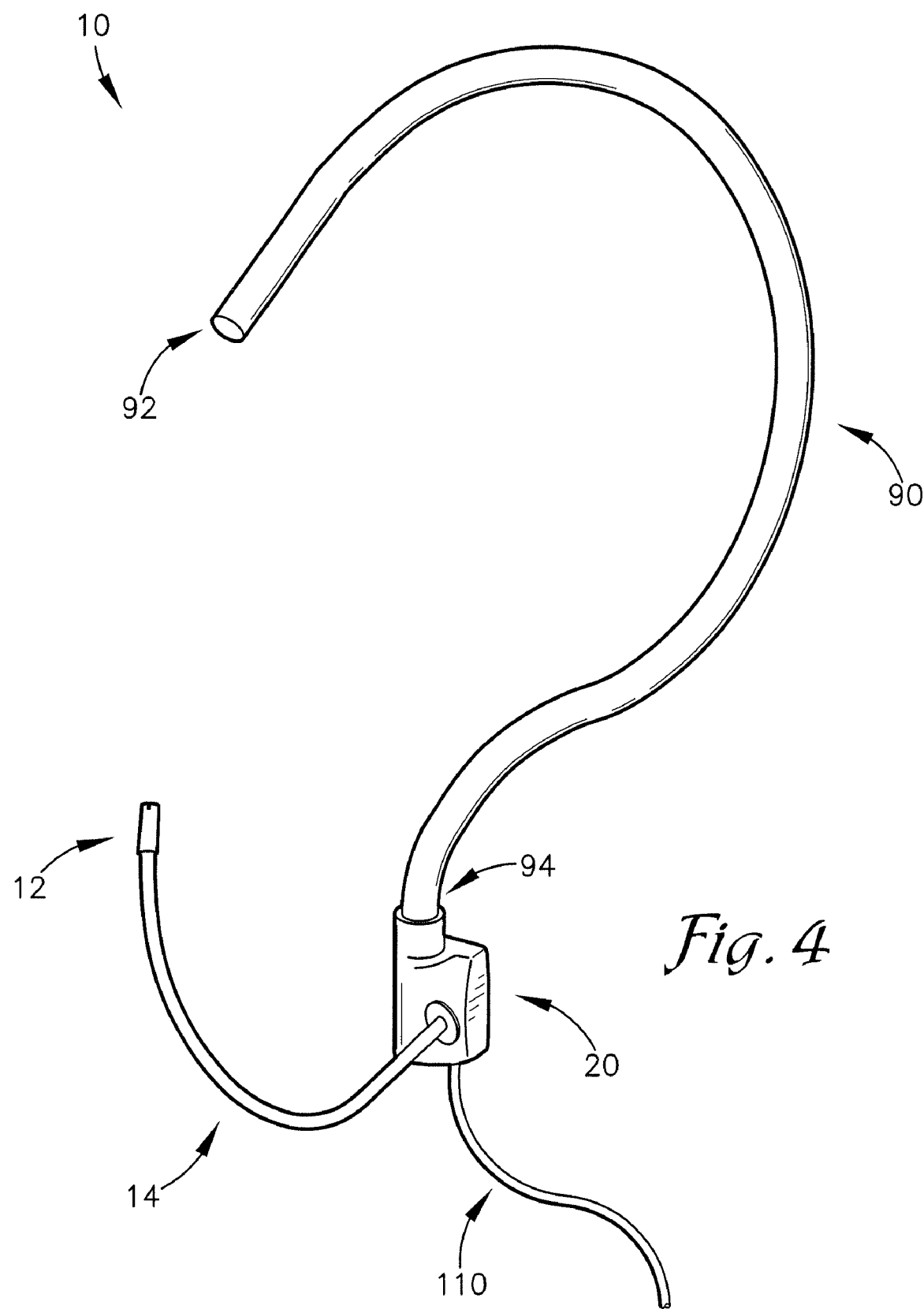
FIG. 4 is a perspective view of another embodiment of the invention.

Another embodiment for the pointing device 10 is shown in FIG. 4. The harness may be formed from a flexible rod 90 that can maintain a desired, on-demand shape. The rod 90 includes a first end 92 and a second end 94. The rod 90 is typically formed in the shape of a hook, such that the first end 92 loops around the user's neck and the second end 94 rests upon a portion of the user's chest. In various embodiments, the rod 90 may include a flexible metal wire coated with a layer of plastic foam. Other materials for the core of the rod 90 are possible providing that the material can be shaped by the user or an assistant and the rod 90 maintain that shape. Other materials, such as rubber, are possible for the coating providing that the material insulates and cushions the core of the rod 90 to increase the level of comfort to the user while the pointing device 10 is being utilized.

The rod 90 is coupled to the component housing 20 at the second end 94. This coupling may be permanent, such as an epoxy bond, or semipermanent, such as threaded mating, providing that the connection is reliable, because the connection between the rod 90 and the component housing 20 holds the housing 20 steady, which in turn, holds the tube 14 and the receptacle 12 in place.

The component housing 20 shown in FIG. 4 may appear different from the housing 20 of the embodiment of the pointing device 10 of FIG. 1, however, the function of the component housing 20 is the same in both embodiments of the pointing device 10. The component housing 20 may be manufactured from injection molded plastic, however, other materials, such as various metals, may be utilized that can house and protect electronic components.

Figure 5:
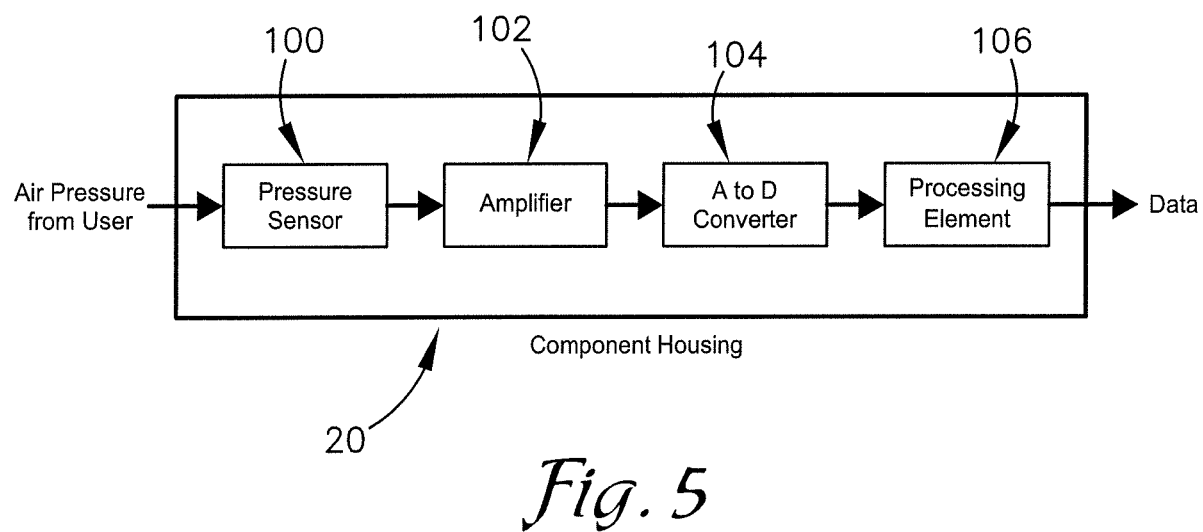
FIG. 5 is a block diagram of the component housing of one embodiment of the invention.

The electronic components of various embodiments of the component housing 20 are illustrated in block diagram form in FIG. 5. Included in the component housing 20 are a pressure sensor 100, an amplifier 102, an analog-to-digital converter (ADC) 104, and a processing element 106.

The pressure sensor 100 may be coupled with the tube 14 and is operable to receive air pressure from the user through the tube 14. The air pressure may be positive, and generated by the user breathing out (puffing). The air pressure may also be negative, and generated by the user breathing in (sipping). The pressure sensor 100 may be a transducing element operable to convert the air pressure from the user to an electronic signal. The pressure sensor 100 is not required to accurately measure the absolute air pressure from the user, but rather the sensor 100 should be able to distinguish whether the user is breathing in or breathing out and subsequently output the appropriate electronic signal. For example, a pressure sensor 100 that is rated to be able to sense a range of pressure from 0 to 10 kPa is configured to measure pressure from −5 kPa to +5 kPa. In this configuration, the pressure sensor 100 may detect both breathing in by the user and breathing out by the user. The pressure sensor 100 may include transducing elements such as strain gauges, piezoresistive semiconductors, and micro-electro-mechanical systems (MEMs).

In various embodiments of the current invention, the electronic signal output of the pressure sensor 100 is converted into positioning data for the pointer 54 that is operable to be recognized by the computing element 50. The output from the pressure sensor 100 is typically an analog voltage. A computer or other electronic equipment typically recognizes a digital data stream. Therefore, the analog output of the pressure sensor 100 may be converted and formatted to a standard protocol in order to be transmitted to the computing element 50. The processing element 106 formats the electronic signal from the pressure sensor into a standardized protocol. However, the processing element 106 typically receives data at its inputs in a digital format. As a result, the analog output of the pressure sensor 100 is converted to a digital format by the ADC 104.

In order for the pressure sensor 100 to communicate with the ADC 104, it is possible that the output signal from the pressure sensor 100 may have to be conditioned before the ADC 104 can recognize it as an input, depending on the output of the pressure sensor 100 and the input to the ADC 104. Thus, it may be necessary to insert the amplifier 102 between the pressure sensor 100 and the ADC 104 to condition the pressure sensor 100 output signal. For example, if the output from the pressure sensor 100 is in the range of millivolts (perhaps 0-50 mV) and the input range of the ADC is in terms of volts (perhaps 0-5V), then the amplifier 102 is needed to increase the range of the pressure sensor 100 output by a factor of one hundred to match the range of the input of the ADC 104.

The amplifier 102 may be a standard electronic signal amplifier comprising discrete components (including active and passive elements) or integrated components, such as operational amplifiers, implemented in one or multi-stage configurations. It may have a single-ended or differential input and a single-ended or differential output. The type of input of the amplifier 102 corresponds to the type of output of the pressure sensor 100. The type of output of the amplifier 102 corresponds to the input of the ADC 104. Similarly, the gain of the amplifier 102 amplifies the output range of the pressure sensor 100 to match the input range of the ADC 104, such that the zero-pressure level of the pressure sensor 100 corresponds to the mid-point of the range of the ADC 104.

The ADC 104 converts the analog signal of the output of the pressure sensor 100 or the amplifier 102 to a digital signal that is compatible with the input data format of the processing element 106. The ADC 104 has a data resolution that is sufficient to convert the negative, zero, and positive pressure levels from the pressure sensor 100 and amplifier 102. Since these levels possess a moderate difference between them and are easily distinguished, the precision requirements are low and thus, a high amount of ADC resolution is not necessary. A variety of ADC structures are possible, although simpler and lower cost ADC implementations are preferred, because high performance of the ADC 104 is not required.

The processing element 106 generally translates the pressures received from the user, through the pressure sensor 100, the amplifier 102, and the ADC 104, into motion data that can position the pointer 54 on the display 52. The motion data includes vertical and horizontal movement of the pointer 54 on the display 52. Additionally, the processing element 106 translates pressures from the user into selection of objects on screen that are in the vicinity of the pointer 54. The movement of the pointer and the selection of objects are standard pointing device (such as a commonly known mouse) functions that correspond to a given binary code that can be understood by the computing element 50. The processing element 106 generates the proper binary code that corresponds to the action desired to be taken by the user. For example, if the user wants to move the pointer 54 toward the top of the display 52 and generates the appropriate air pressure pattern to do so (as discussed below), then the processing element 106 issues the corresponding binary code to the computing element 50. The processing element performs likewise for the other motions and the selection of objects. In this fashion, the electronic display pointing device 10 of the present invention appears to the computing element 50 to be a conventional pointing device, such as a mouse. Furthermore, the processing element 106 is operable to transmit the positioning data serially using a standard serial transmission protocol, such as the Universal Serial Bus (USB) protocol. USB is widely used in a variety of electronic equipment. By implementing the USB format, the pointing device 10 has automatic interface compatibility with any other device employing the USB protocol.

The processing element 106 generally includes a microcontroller, but may also include other digital logic components capable of receiving and generating binary data such as microprocessors, programmable logic devices (PLDs), field programmable gate arrays (FPGAs), fully custom integrated circuits (ICs), application-specific integrated circuits (ASICs), or other digital logic synthesized from a hardware description language (HDL).

In various embodiments of the present invention, it is possible that the functions of the pressure sensor 100, the amplifier 102, the ADC 104, and the processing element 106 are combined and performed by a mixed-signal custom IC or a combination of a custom analog IC and any of the digital logic components discussed above. The input of the IC would be the pressure from the user, similar to the input of the pressure sensor 100, and the output of the IC would be the standard protocol datastream, similar to the output of the processing element 106. Alternatively, other subfunctions may be combined in various groupings as well. For example, the pressure sensor 100, the amplifier 102, and the ADC 104 may be combined in a single unit. The pressure sensor 100 and the amplifier 102 may be combined, or the amplifier 102 and the ADC 104 may be combined.

In various embodiments, the data generated by the processing element 106 is transmitted serially from the processing element 106 to the computing element 50 via a data cable 110, as shown in FIG. 2. The data cable may be a standard USB cable, although other serial data cables are possible. Generally, other means of communication between the processing element 106 and the computing element 50 are also possible. In some embodiments, it is possible that a fiber optic cable may be used for the data cable providing that the data output from the processing element 106 is converted from electrical data to optical data by an optical transmitter. In other embodiments, data may be communicated from the processing element 106 to the computing element 50 wirelessly providing that the data output from the processing element 106 is transmitted by a radio frequency (RF) transmitter. Additionally, these communication functions may be integrated with the pressure sensor 100, amplifier 102, ADC 104, and processing element 106, or combinations thereof, in a mixed signal IC, as discussed above.

Figure 6:
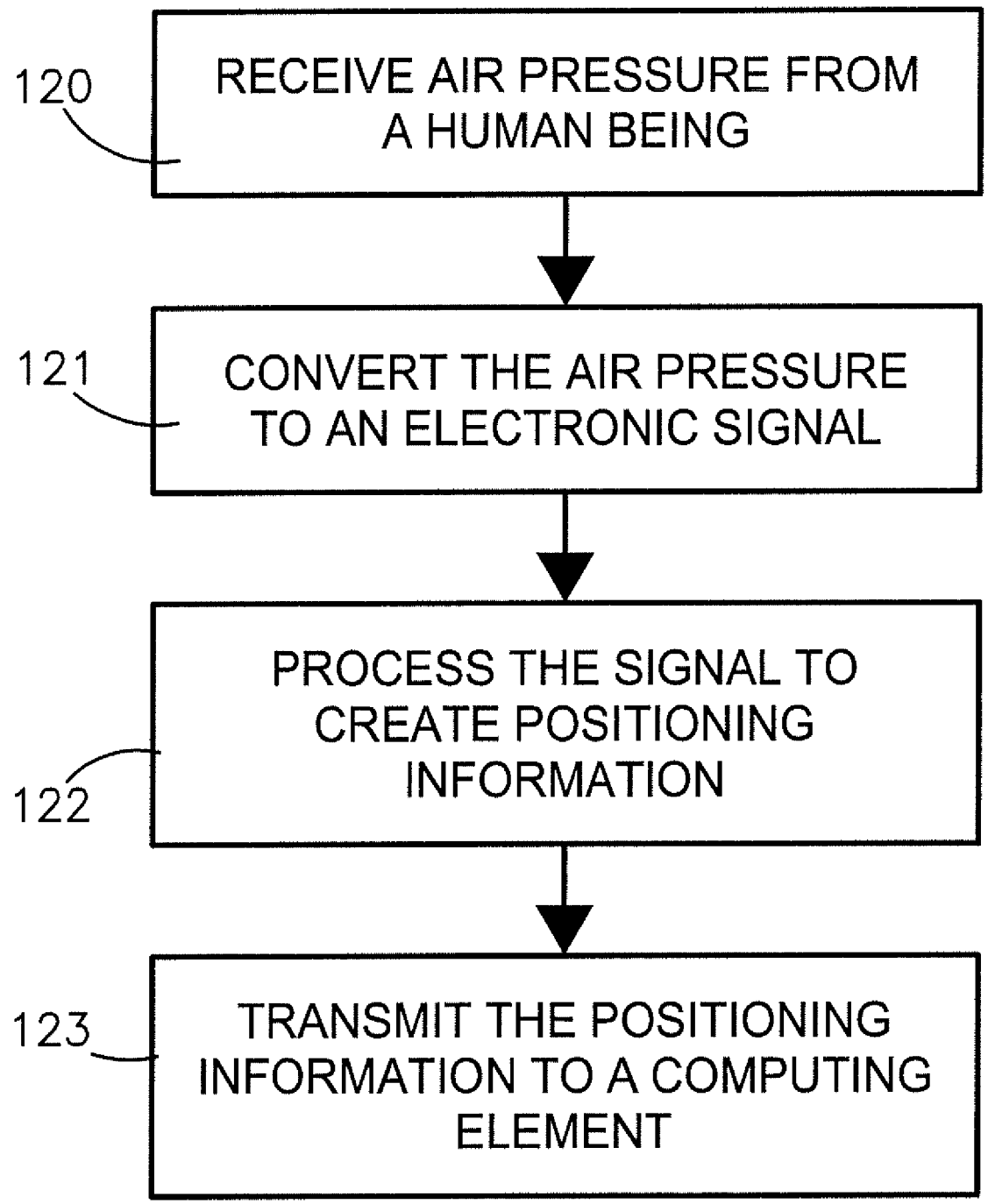
FIG. 6 is chart listing some of the steps operable to be performed by various embodiments of the present invention.

FIG. 6 lists the steps that illustrate the operation of various embodiments of the pointing device 10 to control the pointer 54 on the display 52. Step 120 is to receive air pressure from a human being. The air pressure is generated by the user breathing in, or sipping, and breathing out, or puffing, while retaining the receptacle 12 in his or her mouth (see FIG. 2).

Step 121 is to convert the air pressure to an electronic signal. Air pressure is received from the user through the tube 14 by the pressure sensor 100. The pressure sensor 100 may include a transducer which converts the pressure to the electronic signal which may include an analog voltage level. In various embodiments, the electronic signal may also be amplified and converted to a digital voltage level.

Step 122 is to process the signal to create positioning information. The processing element 106 receives the electronic signal and translates the signal into standard protocol binary commands to move the pointer 54 in the horizontal and vertical directions as well as selecting objects in the vicinity of the pointer 54.

Step 123 is to transmit the positioning information to a computing element. The processing element 106 typically generates the pointer positioning commands to be transmitted in a serial stream. The commands are transmitted with a standard serial data transmission protocol, such as USB to the computing element 50.

Figure 7A:
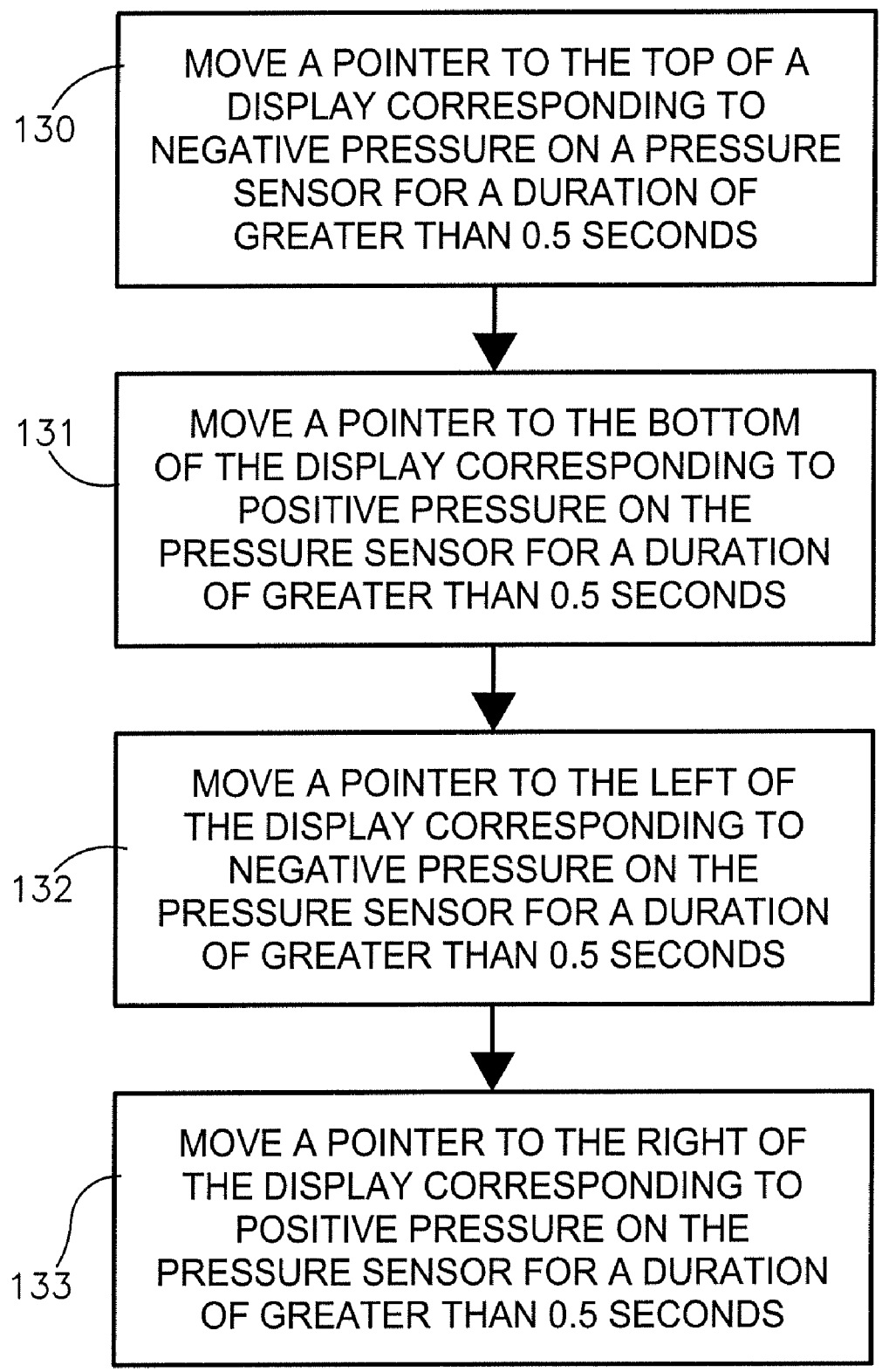

In contrast to the conventional mouse pointing device, which typically converts the motion of the mouse as it is moved over an area into on-screen two-dimensional positioning data, the pointing device 10 of various embodiments of the present invention generates positioning data in one dimension only until the operator initiates a change direction/dimension command, as described below. FIGS. 7A and 7B list the steps that illustrate the operation of various embodiments of the pointing device 10 to control the action of the pointer 54 on the display 52. Step 130 is to move the pointer 54 toward the top of the display 52 (positive y-axis direction) corresponding to negative pressure on the pressure sensor 100 for a duration of greater than 0.5 seconds. The negative pressure is approximately equal to or greater than 3 inches of water vacuum, wherein the negative pressure is generated by the user breathing in or sipping. The motion of the pointer 54 toward the top of the display 52 continues, once initiated, until the user stops generating the air pressure. Step 131 is to move the pointer 54 toward the bottom of the display 52 (negative y-axis direction) corresponding to positive pressure on the pressure sensor 100 for a duration of greater than 0.5 seconds. The positive pressure is approximately equal to or greater than 3 inches of water pressure, wherein the positive pressure is generated by the user breathing out or puffing. The motion of the pointer 54 toward the bottom of the display 52 continues, once initiated, until the user stops generating the air pressure.

Step 132 is to move the pointer 54 toward the left side of the display 52 (negative x-axis direction) corresponding to negative pressure on the pressure sensor 100 for a duration of greater than 0.5 seconds. The negative pressure is approximately equal to or greater than 3 inches of water vacuum, wherein the negative pressure is generated by the user breathing in or sipping. The motion of the pointer 54 toward the left side of the display 52 continues, once initiated, until the user stops generating the air pressure. Step 133 is to move the pointer 54 toward the right side of the display 52 (positive x-axis direction) corresponding to positive pressure on the pressure sensor 100 for a duration of greater than 0.5 seconds. The positive pressure is approximately equal to or greater than 3 inches of water pressure, wherein the positive pressure is generated by the user breathing out or puffing. The motion of the pointer 54 toward the right side of the display 52 continues, once initiated, until the user stops generating the air pressure.

Steps 130 and 131 are similar to steps 132 and 133 once the direction of motion control has been changed. Step 134 accomplishes this task and states, toggle the motion of the pointer 54 between the horizontal and vertical directions corresponding to negative pressure on the pressure sensor 100 for a duration of less than 0.5 seconds. The negative pressure is approximately equal to or greater than 3 inches of water vacuum, wherein the negative pressure is generated by the user breathing in quickly or quick sipping. The user knows that the direction of motion has successfully been changed because the processing element 106 generates a series of commands to the computing element 50 to move or wiggle the pointer 54 back and forth in the direction that the pointer 54 will now move.

The user may also perform what is known as a "left click" on a conventional mouse pointing device. Step 135 is to select an object on the display 52 in the vicinity of the pointer 54 corresponding to positive pressure on the pressure sensor 100 for a duration of less than 0.5 seconds. The positive pressure is approximately equal to or greater than 3 inches of water pressure, wherein the positive pressure is generated by the user breathing out quickly or quick puffing.

The actions that control the motions and select function of the pointing device 10 may be varied and still fall within the scope of the present invention. The values of the pressures and the durations of time may be varied or even swapped among the functions. For example, moving the pointer 54 to the top of the display 52 may be accomplished by generating negative pressure or positive pressure as along as moving the pointer 54 to the bottom of the display 52 is accomplished by generating the opposite pressure. Likewise for moving the pointer 54 in the horizontal direction. Similarly, the time duration threshold may be changed from 0.5 seconds to 1 second, for example, and still remain within the scope of the present invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of controlling a pointer on an electronic display, comprising the steps of:
   (a) moving a pointer toward the top of a display, wherein moving the pointer corresponds to a first pressure on a pressure sensor for a first time duration;
   (b) moving the pointer toward the bottom of the display, wherein moving the pointer corresponds to a second pressure on the pressure sensor for a second time duration;
   (c) moving the pointer toward the left side of the display, wherein moving the pointer corresponds to a third pressure on the pressure sensor for a third time duration; and
   (d) moving the pointer toward the right side of the display, wherein moving the pointer corresponds to a fourth pressure on the pressure sensor for a fourth time duration.

2. The method of claim 1, further comprising the steps of:
   (e) toggling a motion of the pointer between a horizontal direction and a vertical direction, wherein toggling the motion corresponds to a fifth pressure on the pressure sensor for a fifth time duration; and
   (f) selecting an object on the display in the vicinity of the pointer, wherein selecting the object corresponds to a sixth pressure on the pressure sensor for a sixth time duration.

3. The method of claim 1, wherein the first, third, and fifth pressures on the pressure sensor correspond to breathing in by a human being.

4. The method of claim 1, wherein the second, fourth, and sixth pressures on the pressure sensor correspond to breathing out by a human being.

5. The method of claim 1, wherein the first, second, third, and fourth time durations correspond to greater than 0.5 seconds.

6. The method of claim 1, wherein the fifth and sixth time durations correspond to less than 0.5 seconds.

* * * * *